United States Patent [19]

Sarkozy

[11] Patent Number: 5,732,238

[45] Date of Patent: Mar. 24, 1998

[54] NON-VOLATILE CACHE FOR PROVIDING DATA INTEGRITY IN OPERATION WITH A VOLATILE DEMAND PAGING CACHE IN A DATA STORAGE SYSTEM

[75] Inventor: Andras Sarkozy, Nashua, N.H.

[73] Assignee: Storage Computer Corporation, Nashua, N.H.

[21] Appl. No.: 668,622

[22] Filed: Jun. 12, 1996

[51] Int. Cl.$^6$ ................................................ G06F 12/08
[52] U.S. Cl. ...................... 395/440; 395/489; 395/462; 395/467
[58] Field of Search ........................ 395/440, 441, 395/488, 471, 415–419, 403, 496, 462, 489, 467

[56] References Cited

U.S. PATENT DOCUMENTS

| | | | |
|---|---|---|---|
| 5,257,367 | 10/1993 | Goodlander et al. | 395/620 |
| 5,418,921 | 5/1995 | Cortney et al. | 395/441 |
| 5,519,831 | 5/1996 | Holzhammer | 395/182.2 |
| 5,519,853 | 5/1996 | Moran et al. | 395/550 |
| 5,530,829 | 6/1996 | Beardsley et al. | 395/440 |
| 5,551,002 | 8/1996 | Rosich et al. | 395/461 |
| 5,572,660 | 11/1996 | Jones | 395/182.04 |
| 5,581,726 | 12/1996 | Tanaka | 395/461 |
| 5,586,291 | 12/1996 | Lasker et al. | 395/440 |

*Primary Examiner*—Matthew M. Kim
*Attorney, Agent, or Firm*—Davis & Bujold

[57] ABSTRACT

A non-volatile cache mechanism connected to a bus connected for conducting write addresses and data from a host computer to mass storage devices and to a volatile cache wherein each write operation includes a write address and at least one data word. The non-volatile cache mechanism includes a non-volatile memory constructed of a plurality of sub-memories having overlapping read/write cycles for storing the data words, a cache control responsive to the write operations for writing the data words into the nonvolatile memory in parallel with receipt of the data words into the volatile cache, and a cache index for storing index entries relating write addresses of write operations on the bus with corresponding storage addresses of the data words in the non-volatile memory. The cache control is responsive to a write operation for reading the index entries to identify and select at least one available storage address in the non-volatile memory, generating at least one index entry relating the write address of the current write operation and the selected storage addresses in the non-volatile memory, and writing the data words into the non-volatile memory. The cache control is responsive to flush addresses to the volatile cache for indexing the cache index to identify cache entries corresponding to the flush addresses and invalidating the corresponding cache entries.

5 Claims, 6 Drawing Sheets

NON-VOLATILE CACHE FOR PROVIDING DATA INTEGRITY IN OPERATION WITH A VOLATILE DEMAND PAGING CACHE IN A DATA STORAGE SYSTEM

CROSS REFERENCE TO RELATED APPLICATIONS

The present patent application is related to:

U.S. Pat. No. 5,257,367 to Goodlander et al. for a Data Storage System With Asynchronous Host Operating System Communication Link, filed on Jul. 17, 1990 as U.S. patent application Ser. No. 544,127 and issued on Oct. 26, 1993 and assigned to the assignee of the present patent application.

FIELD OF THE INVENTION

The present invention relates to an improved system for storing data in a mass storage system associated with a data processing system and, in particular, a method and system for storing data in a non-volatile cache associated with a volatile cache operating essentially as a demand pagings system.

BACKGROUND OF THE INVENTION

The increased power and speed of contemporary computer systems has resulted in a corresponding demand for significantly increased mass storage capability because of the increased volumes of data dealt with by the systems and the increased size of the operating system and applications programs executed by such systems. There are a variety of mass storage devices available, such as disk drives, optical drives and tape drives, and one approach of the prior art to the mass storage problem is the use of mass storage systems associated with the computer systems. An example of a mass storage system is described in U.S. Pat. No. 5,257,367, cited above, and may be taken as illustrative of this general approach to the mass storage problem. Typically, such a mass storage system will include a plurality of relatively fast mass storage devices, such as disk drives, together with one or more slower but larger archival type storage devices, such as a tape drive or optical drive, and a processor based storage system management unit, sometimes referred to as a "disk platform", to manage and control the transfer and storage of data between the mass storage system and the associated host computer system. In many such systems, such as that described in U.S. Pat. No. 5,257,367, the storage system management unit is connected to the host computer system in the same manner as a conventional disk drive, and through a conventional disk drive controller normally present in the host computer system, to appear to the host computer system as a conventional disk drive, although with significantly increased storage space.

Most mass storage devices, however, are characterized by relatively low data access and transfer rates compared to the computer systems with operate with the data and programs stored therein, and the data transfer rate between the mass storage systems and the host computer systems may be further limited by the data transfer rates of the buses interconnecting the units in the system. As a consequence, and although the mass storage capabilities of host computer systems has been increased significantly, the speed of data read and write access has not increased proportionally but has remained a problem.

While there have been many attempts in the prior art to solve the problem of data access speed for mass storage systems, they have typically taken the form of increasing the number of disk drives, for example, to store related data items and their associated parity information across several drives in parallel and thereby overlapping the initial data access time to each drive and increasing the efficiency of bus transfers. An extreme manifestation of this approach was found, for example, in the Thinking machines Corporation CM-2 system which operated with 39 bit words, each containing 32 data bits and 7 party bits, and stored the bits of each word in parallel across 39 disk drives, on bit to each drive. The CM-2, however, was a dedicated special purpose system employing 64 thousand processors in parallel arrays to perform a few specialized array operations and was essentially hardwired into a fixed configuration unsuitable for general usages. In general, however, and while such approaches have provided some increase in data read/write rates, there is a limit to the speed increases provided by such approaches because of other factors effecting all such systems, including the CM-2.

Another approach used to increase the speed of operation of mass storage systems, and in fact to increase the speed of operation of memory and disk storage operations in computer systems in general, has been the use of cache memories of various forms to provide higher speed storage for at least a portion of the data stored in memory or on disk, usually the most frequently or most recently used data. A recurring problem with such caching mechanisms, however, is, first, that they generally involve additional operations of the buses transferring data to and from the mass storage devices and, second, that they are usually constructed from volative memory devices in order to obtain the necessary speed of operation. As such, there is a significant risk that data that has been modified and stored in the cache memory awaiting write-back to the mass storage device will be lost if there is an interruption to system operation, such as a power loss.

The present invention provides a solution to these and other problems of the prior art.

SUMMARY OF THE INVENTION

The present invention is directed to a non-volatile cache mechanism for use in a mass storage mechanism connected from a host computer system for storing data operated upon by the host computer system. The mass storage system includes a plurality of mass storage devices, a bus connected from the host computer system for conducting write addresses and data from the host computer system to the mass storage devices, a volatile cache connected from the bus for storing data to be written to the mass storage devices, and a cache control processor connected from the bus and responsive to write operations on the bus for writing the data to be written into the mass storage devices into the volatile cache mechanism, wherein each write operation includes a write address and at least one data word.

According to the present invention, the non-volatile cache mechanism includes a non-volatile memory connected from the bus for receiving and storing the data words, a cache control connected from the bus and to the non-volatile memory and responsive to the write operations for controlling write operations of the non-volatile memory for writing the data words into the non-volatile memory in parallel with receipt of the data words into the volatile cache mechanism, and a cache index connected from the cache control for storing index entries relating write addresses of write operations on the bus with corresponding storage addresses of the data words in the non-volatile memory.

The cache control is responsive to a current write operation for reading the write address of the write operation, reading the index entries stored in the cache index to identify and select at least one available storage address in the non-volatile memory for storing the at least one data word of the current write operation, and generating at least one index entry relating the write address of the current write operation and a selected at least one storage address in the non-volatile memory. The cache control then generates write control signals controlling the non-volatile memory to write the at least one data word of the current write operation into the selected at least one storage address in the non-volatile memory.

Further according to the present invention, the non-volatile memory is constructed of a plurality of non-volatile sub-memories, wherein each storage address identifies a corresponding storage location in each one of the plurality of non-volatile sub-memories, and the cache control generates write control signals to each of the plurality of nonvolatile sub-memories so that corresponding write operations of each of the plurality of non-volatile sub-memories are sequentially overlapping so that a data word of the at least one data word of a write operation on the bus is written into a corresponding one of the plurality of non-volatile sub-memories at the rate at which the data words of the write operation appear on the bus.

In a still further aspect of the present invention, the cache control processor is operative to flush at least certain ones of the data words from the volatile cache mechanism by providing flush addresses corresponding to the write addresses of previous write operations on the bus to the volatile cache mechanism. The cache control of the non-volatile cache mechanism of the present invention is in turn connected from the cache control processor and responsive to the flush addresses for indexing the cache index to identify cache entries corresponding to the flush addresses and invalidating the corresponding cache entries.

Still further according to the present invention, each index entry includes a write address field for storing a write address of a corresponding write operation, a length field for storing information identifying the number of data words in the at least one data word of the corresponding write operation, a cache address field for storing the corresponding storage address in the non-volatile memory, and a validity field for storing information identifying whether the corresponding data words stored in the non-volatile memory are valid. In this regard, the cache control responds to the flush addresses by invalidating the corresponding index entries by setting the information therein to the invalid state.

DESCRIPTION OF THE DRAWINGS

The foregoing and other objects, features and advantages of the present invention will be apparent from the following description of the invention and embodiments thereof, as illustrated in the accompanying figures, wherein:

FIGS. 1(a) to (i) show the historical development of the performance of computer systems;

FIGS. 1(a–g), present a simplified block diagram of a prior art approach to a disk-based memory system;

DESCRIPTION OF THE INVENTION

The following will first describe two implementations of mass storage systems and host computer systems in which the present invention may be implemented and used, the second being a significant improvement over the first and being the subject of U.S. Pat. No. 5,257,367, and will then describe the present invention.

A. General Description of Host Computer Systems With Associated Mass Storage Systems (FIGS. 1(a) through 1(h) and 2 through 6)

Figure 1A:
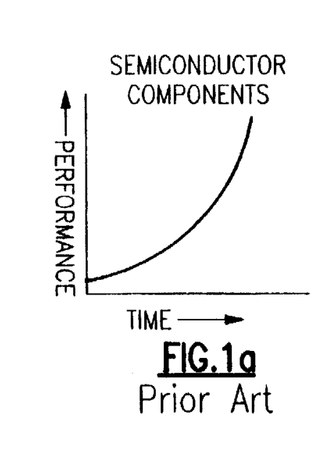
Figure 1B:
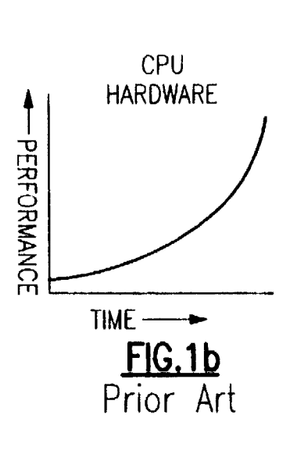
Figure 1C:
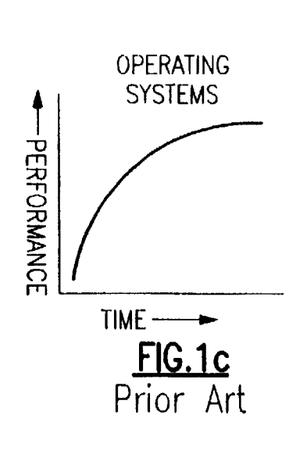
Figure 1D:
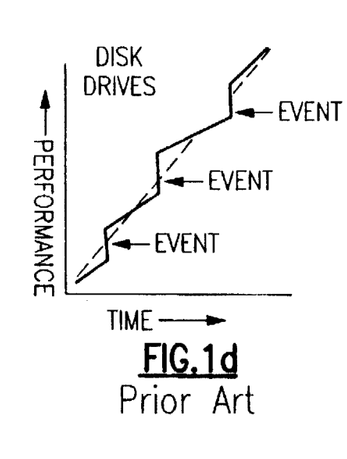
Figures 1E, 1F:
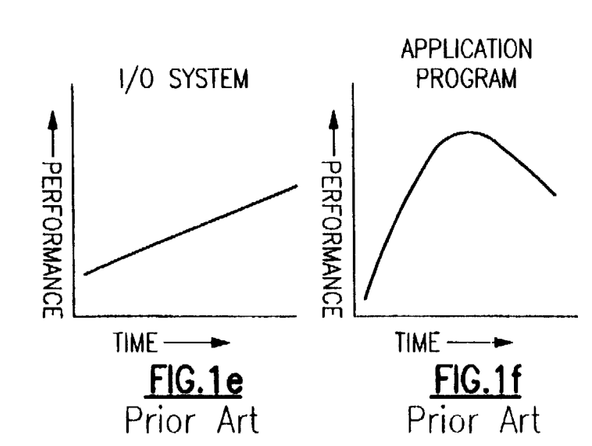
Figure 1G:
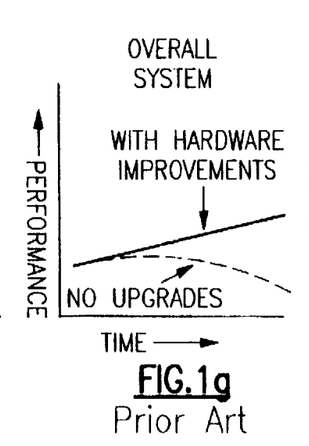

A given system's overall performance capability is the result of the integration of a number of independent technologies whose individual growth in performance/capability over time differs markedly from each other. FIG. 1(a) to (g) shows the historical performance of computer systems' underlying technologies. FIG. 1 a shows the exponential growth in semiconductor component performance. The factors behind this are well known and include advances in process technology that increase circuit density and speed. Shrinking geometry's and increased wafer yields combined with circuit design innovations mean semiconductor performance should continue its exponential growth. FIG. 1b reflects the exponential growth in CPU hardware performance as measured in MIPS. CPU's are the direct beneficiaries of semiconductors as well as circuit design improvements and architectural innovations such as massively parallel CPU's. FIG. 1c shows the trend in performance for operating systems. OS performance is being flattened by several factors such as the additions of user interfaces, graphics support, and the sheer growth in size over the years, which has made OS's one of the most voracious consumers of computer resources. FIG. 1d shows the capacity/performance improvements of disk drives. This curve could be best described as "leap-linear." Disk drive device performance and capacities tend to grow linearly until a new technological event occurs. Such events in the past have been the introduction of sealed disk Winchester technology in the early 70s, the introduction of thin film heads and plated media in the 80s, and, in the 90s, the general introduction of 5400 and 7200 RPM drives to cut latency delays and contact recording technology that may push track densities to 100,000 per inch. FIG. 1e demonstrates the performance of I/O systems. This curve represents the composite effect of CPU and controller hardware, operating systems, and disk drives. It should be noted that the exponential growth in semiconductor performance has not been reflected in I/O system performance, which has seen near linear growth. FIG. 1f reflects a commonly understood phenomena with applications programs that, over time, additions, changes, and maintenance to the program tend to lead to a decrease in its performance. FIG. 1g demonstrates that, over all systems performance has showed continued improvement, but at a much slower rate than its underlying technologies. In fact, without hardware upgrades and improvements over all system performance declines in response to the performance of operating systems and application programs.

Figure 1H:
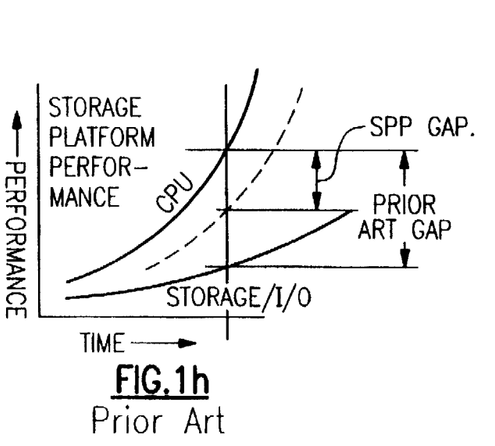
FIGS. 1(h) and 1(i) illustrate an improved system in which the present invention could be implemented.

FIG. 1(h) shows a typical prior art computer system employing disk drives for storage. The host computer 10 (i.e. the one interfacing with the computer operators) includes an operating system 12. As known to those skilled in the art, the operating system is a set of computer programs that run continuously while the computer has its power on. The operating system controls all the functions of the computer including requests for operating portions of the memory, error response, and input/output (I/O) requests. The computer 10 has a disk controller 14 connected thereto and the disk controller 14, in turn, is connected to four disk drives 16. In use, an applications program (not shown) makes a request for data from the operating system 12. The location of the data is completely transparent to the applications program; that is, the applications program has no idea where the data is physically located. At system setup time (or possibly subsequently through operator input), the locations of the data is stored in tables (not shown) which are part of or accessible by the operating system 12. Knowing from the tables that the requested data is on a particular disk drive 16 at a particular track between starting and ending sectors, the operating system 12 outputs a disk read request on line 18 to the disk controller 14. The disk controller 14, in turn, then issues a read request to the appropriate disk drive 16 on its connecting line 20 which causes the read head (not shown) within the disk drive 16 to move to the designated track and then read data and output it to the disk controller 14 on the line 20 from the starting sector to the ending sector. When the data has been received by the disk controller 14 (into an appropriate cache/buffer memory, the operating system 12 is informed by an appropriate signal on line 18.

As can be appreciated, if one wants the operating system 12 to do more, the programming of the operating system 12 must get more complex. Given the present state of complexity of the typical operating system and the capabilities of the average systems' computer programmer with respect to such esoteric matters as re-entrant coding and "run anywhere" coding, to ask the operating system to do more is to ask for trouble because of information handling bottle necks.

There is also the problem of system overhead. If you ask the operating system to do more, it will add to the overhead of the operating system and, therefore, to the overhead of every program which accesses it.

For any given OS and computer system, implementation of any real time function will cause the OS to consume a large portion of the computing resource, rapidly degrade the performance of the system from the user's perspective, and severely limit the work product computing potential.

As those skilled in the art will also readily recognize and appreciate, even if the penalty of added overhead is made to the operating system so as to achieve the convenience in other areas, such an approach includes no means of ever reducing the added overhead.

File Maintenance, Management, and Archival Copy (FMMAC) are tasks essential to the reliability, usability, and integrity of computer stored data. These tasks are now performed by Operating Systems functions, separately run applications programs, operator or system manager manual intervention, or a combination of these techniques.

These FMMAC tasks almost always require a manual operator decision to initiate and complete. Often they require the computer system to be taken off-line and therefore not available to users during the time it takes to complete these tasks. Some larger, sophisticated Operating Systems allow a designated File to be taken off-line leaving most of the computer resource available. However, manual intervention is still required to initiate file maintenance and archival copy.

Because these crucial FMMAC tasks rely on manual intervention, arbitrary circumstances and schedules, the predictability of these tasks being performed is low. This is especially true outside of centralized "Mainflame" Computer centers (FMMAC tasks are typically performed here by a dedicated maintenance shift at great additional operating expense). However, most computers (and by extension, most computer stored data) are not located inside "computer centers" or have the benefit of dedicated file maintenance staffs. Therefore the reliability, usability, and integrity of most computer stored data now rests on human nature and motivation and the dubious assumption that the circumstances surrounding the computer system itself are immune from intervening events such as device failures or rush jobs that take priority over FMMAC tasks.

Continuous duty computer systems such as Real Time monitoring and control systems or On-line Transaction Processing systems present additional barriers to FMMAC tasks. In theory, no time is available to perform the tasks. In reality, such systems or files are simply shut off for FMMAC. In "Critical Mission" applications (for example Nuclear Power Plant Monitoring and Control) the FMMAC problem is often abated by duplicating hardware systems at great economic cost.

In the above-referenced patent, the system of which is described next herein below as illustrative of the systems in which the present invention may be embodied, a high-speed, high-capacity, fault-tolerant, error-correcting storage system was disclosed which provides a solution for many of the above-described needs of modem computer systems (both military and commercial).

Figure 1I:
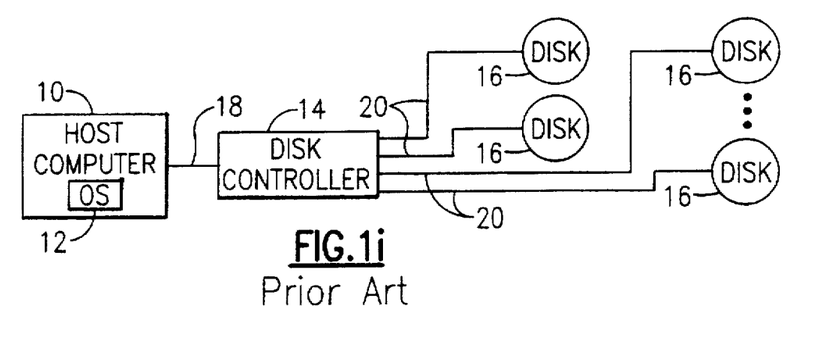
Figure 2:
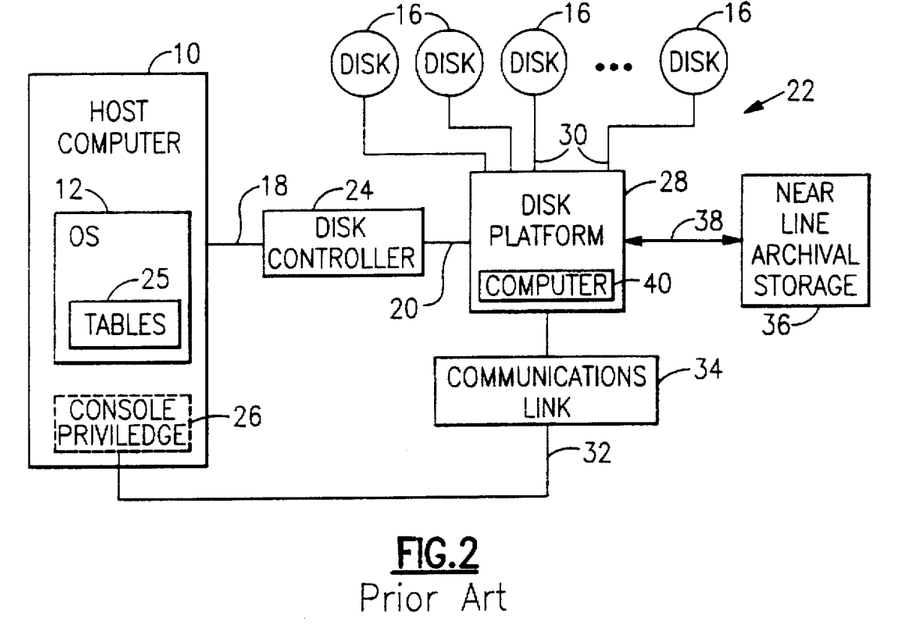
FIG. 2 is a simplified block diagram of a platform-based disk memory system that could implement the present invention.

An improved overall computer system employing both disk and near line archival storage and typical of the systems in which the present invention may be employed is shown in FIG. 2 where it is generally indicated as 22. The system 22 has a host computer 10 containing an operating system 12 with its tables 24. There is also a console privilege interface 26 by means of which outside user consoles (not shown) can be used to access the host computer operating system 12. There is once again a disk controller 24 since there is no change to the operating system 12 and the operating system 12 is set up to interface with the disk controller 24. Rather than being connected directly to the disk drives 16 as in the prior art approach of FIG. 1(i), however, the single line 20 from the disk controller 24 is connected to an intelligent disk platform 28. The disk platform 28 is then connected to interface with the disk drives 16 through lines 30. Additionally, the disk platform 28 has a bi-directional connection 32 through a communications link 34 to the console privilege interface 26. In the preferred embodiment as applicable for large-scale storage systems, there is also near line archival storage apparatus 36 connected to the disk platform 28 through line 38. To perform within the system 22 of this invention, the near line storage apparatus 36 should be of an automated variety selected from any of a number well known in the art where off-line storage media are loaded for reading and writing on request by automated mechanisms so as to avoid the necessity of operator intervention.

To accomplish its unique improvements over the prior art, the disk platform 28 includes its own computing capability as represented by the computer block 40. As will be seen shortly, the computer 40 may, in fact, comprise multiple processing units; but, for the present it is sufficient to note that the disk platform 28 is not the "dumb" controller 14 of the prior art. Employing the bi-directional connection 32 through the communications link 34 to the console privilege interface 26, the computer 40 can find the location of data from the tables 24 of the operating system 12. The location of data within the disk drives 16 or the near line archival storage apparatus 36 is, therefore, transparent to both the operating system 12 and the applications programs requesting it. If requested data is located on the near line archival storage apparatus 36, it can be retrieved automatically and then be relayed to the operating system 12 just as if it was on one of the disk drives 16. More importantly, the preferred computer 40 is of the self learning variety which learns through experience. Thus, for example, if a particular file from the near line archival storage apparatus 36 is used at a given time and/or day each month (as in preparing a payroll), the logic of the computer 40 will learn that from experience and begin loading the file from the near line storage apparatus 36 in anticipation of the expected request so that when the request is made, the file is already read in and available for use. Thus, the overall system performance of the system 22 is not only improved over the prior art for a given level of file location transparency to the users; but, additionally, the overhead drops as the system teams the repeated patterns of use associated with its users. In addition, whereas the prior art approach of FIG. 1(i) could only do system and equipment diagnostics by taking the computer 10 off-line or by increasing the complexity and overhead of the operating system 12 once again by having the operating system 12 perform such functions in a background mode, the storage system and equipment diagnostics are now performed by the computer 40 located within the disk platform 28 on a continuing and time-available basis. As will be seen from the description which follows, when the disk drives 16 have a fault or error, any errors and problems found can be corrected or at least pin pointed for operator correction and replacement without taking the system 22 off line or causing any significant degrading of the performance thereof.

Figure 3:
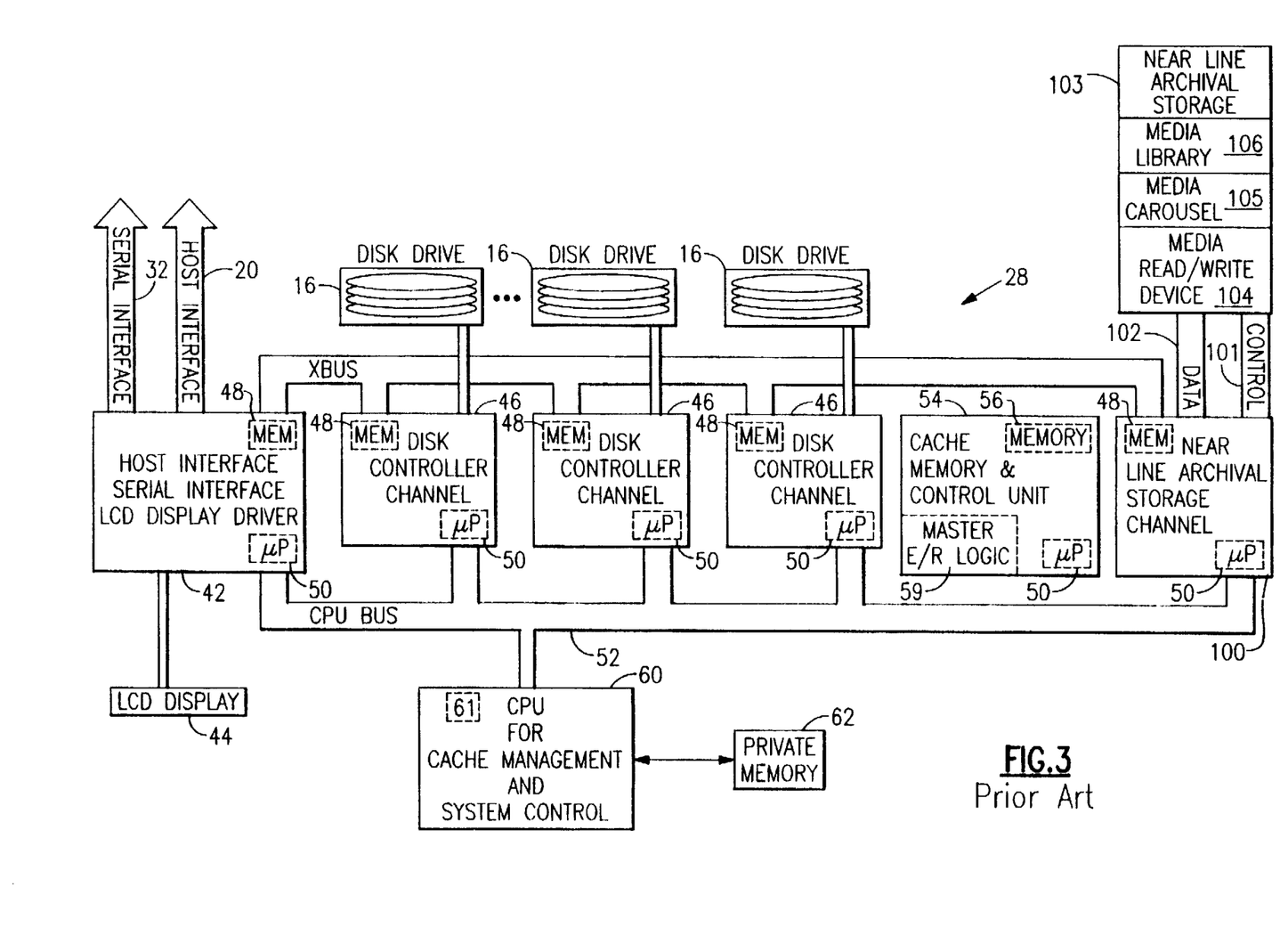
FIG. 3 is a simplified block diagram of the disk memory platform of the system of FIG. 2.

Having thus described a preferred overall system approach to storage systems, attention will now be turned to a preferred construction of the disk platform 28. That system employed individual disk channel controllers for respective ones of the disk drives 16 and each of the disk channel controllers included a cache/buffer memory. All the disk channel controllers were controlled by control signals from a common control computer and both data and the control signals employed the same bus. As depicted in FIG. 3, the preferred disk platform 28 of this disclosure has been restructured to greatly improve the performance while, at the same time, also substantially reducing the complexity whereby the reliability is increased and the implementation thereof is greatly simplified with attendant known benefits.

In FIG. 3, line 18 is labeled as the "SERIAL INTERFACE" and line 20 is labeled as the "HOST INTERFACE". In a tested embodiment, the SERIAL INTERFACE of line 18 is an RS-232 interface and the HOST INTERFACE of line 20 is a SCSI (small computer system interface) interface. This choice was as a result of the availability of commonly-used equipment for use in testing only and those skilled in the art will readily recognize and appreciate that the same techniques being described here by way of example could be accomplished employing other hardware interface methods and apparatus known in the art, or yet to be developed. In this regard, the improvements of this invention are both universal and adaptable. The two lines are connected to a interface and driver unit 42 which provides the host interface, serial interface, and LCD display driver functions as indicated therein. The logic and apparatus of interface and driver unit 42 is also connected to a display 44. The display 44 is not an absolute requirement; but, is preferred so that messages can be provided to an operator as, for example, in the event of a detected malfunctioning disk drive 16 which has been removed from operation and should be replaced in order to restore full system capability.

There are a plurality of disk controller channels 46 connected to respective ones of a plurality of disk drives 16. It is preferred for error detection and correction optimization that at least one extra disk controller channel 46 and associated disk drive 16 be up and running at all times to be used as a "hot" replacement in the event of a detected error or potential problem. Thus, it is preferable to dynamically substitute a disk channel and let the problem channel be fixed by service personnel off-line. When repaired, that channel can then become the hot replacement. Each of the disk controller channels 46 again has a cache/buffer memory 48 associated therewith. Where the memory of the disk controller channels performed the dual function of a memory buffer into which to read and from which to write with respect to the disk drive connected thereto and a cache memory, the memories 48 of this invention in general perform the buffer function. It is preferred that the memories 48 be sized to be involved in more than one transfer at a time so that at least one stream of data can be read into the memory 48 while another stream of data is being written out of the memory 48. In many systems of the prior art, the disk controller channels were dumb or had little memory capacity; that is, they did not include any computing power. Thus, the disk controller channels had to be fed a stream of low level commands, resulting in a large amount of non-data traffic sharing the bus with the data. That, of course, reduced the overall throughput of data along the bus. In the "intelligent" disk controller channels 46, the disk controller channels 46 are provided only with high level command signals and accomplish the balance of the indicated read and write functions internally with the micro-processors 50. Thus, the amount of non-data traffic on the CPU bus 52 is greatly reduced, allowing more available time for the transfer of data—which, of course, should be the primary function thereof for optimum system performance.

A significant element of this application is the cache memory & control unit 54. While the memories 48 of the disk controller channels 46 in the tested embodiment are each 8K bytes in size, the cache memory 56 of the cache memory & control unit 54 is 16M bytes. The cache memory & control unit 54 also includes its own microprocessor 58 and master error recovery logic 59.

Finally, the preferred disk platform 28 includes a central processing unit (CPU) 60 with its own private memory 62. The CPU 60 is employed for cache management and system control functions in a manner to be described shortly. As shown in FIG. 3, the above-described components with the exception of the CPU 60 are interconnected to communicate with one another by the XBUS 64 and interconnected to communicate with the CPU 60 by means of the CPU bus 52.

As mentioned above, not only is the transfer of data between the memories 48 and the disk drives 16 done asynchronously as in the prior disclosure; but, additionally, transfers into and out of the cache memory 56 is done asynchronously. Because of its size (i.e. 16M bytes) the cache memory 56 can be employed for the transfer of multiple requests from the host computer 10 at one time.

Because of access times of the disk drives 16, lengths of transfers requested, and/or data portions already in the cache memory 56, the requests to read and write data from the CPU 60 to the disk platform 28 may not be responded to in the order received. As soon as a request is completed, no matter its position in the request sequence, the CPU 60 is informed that it is completed. Thus, throughput as seen by the host computer 10 is greatly improved.

The CPU 60 includes an embedded array disk operating system 61 and employs its private memory 62 to keep track of the contents of the cache memory 56 so that it can respond optimally to requests from the host computer 10. The CPU 60 in this system only issues high level commands to the disk controller channels 46 so that the multiple, low-level command approach, which occupied valuable time on the CPU bus 66, is eliminated. The micro-processors 50 each contain firmware that not only performs the actual low-level command steps required to do disk transfers; but, in addition, performs continuing self-testing of the individual controller channel on a time-available basis to assure that the components are continuing to work properly. Should such self-check indicate a potential problem, the CPU 60 then conducts further testing of the subject disk controller channel 46 to see if an on-line "hot" spare disk drive 16 or disk controller channel 46 should be employed while the malfunctioning unit is flagged for work on the display 44 and removed from use temporarily.

By putting the CPU 60, by way of micro-processor 58, in complete charge of transfers between the memories 48 and the cache memory 56 the problem of dealing with bus arbitration on the XBUS 64 is also eliminated. That, of course, has many beneficial effects such as increased reliability, increased throughput, and simplicity of implementation.

Figure 4:
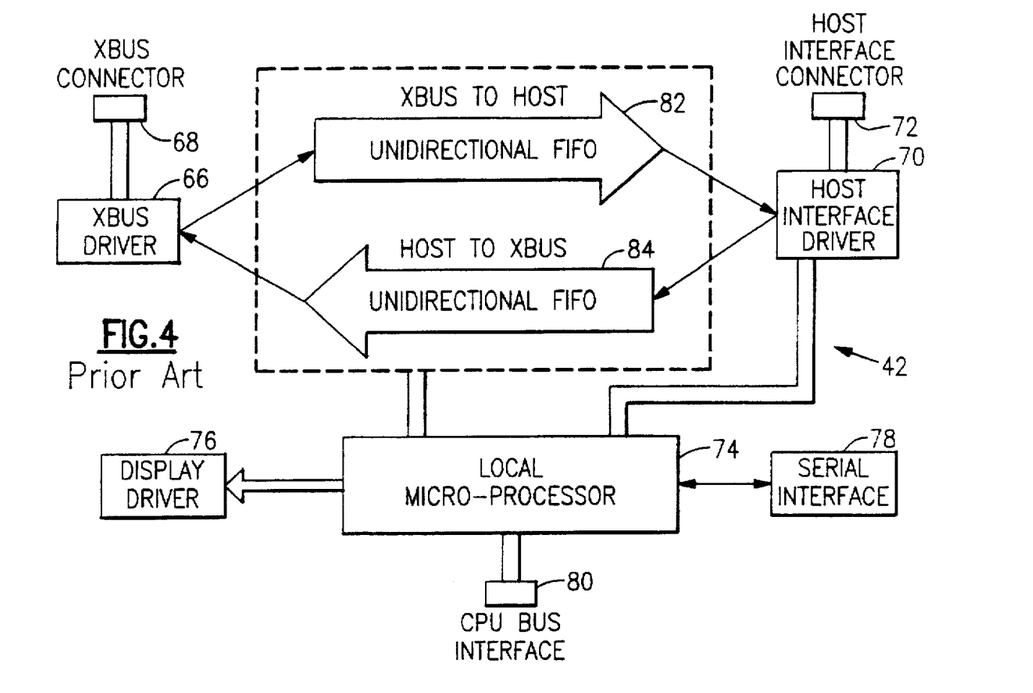
FIG. 4 is a simplified block diagram of the host interface block of the disk memory platform of FIG. 3.
Figure 5:
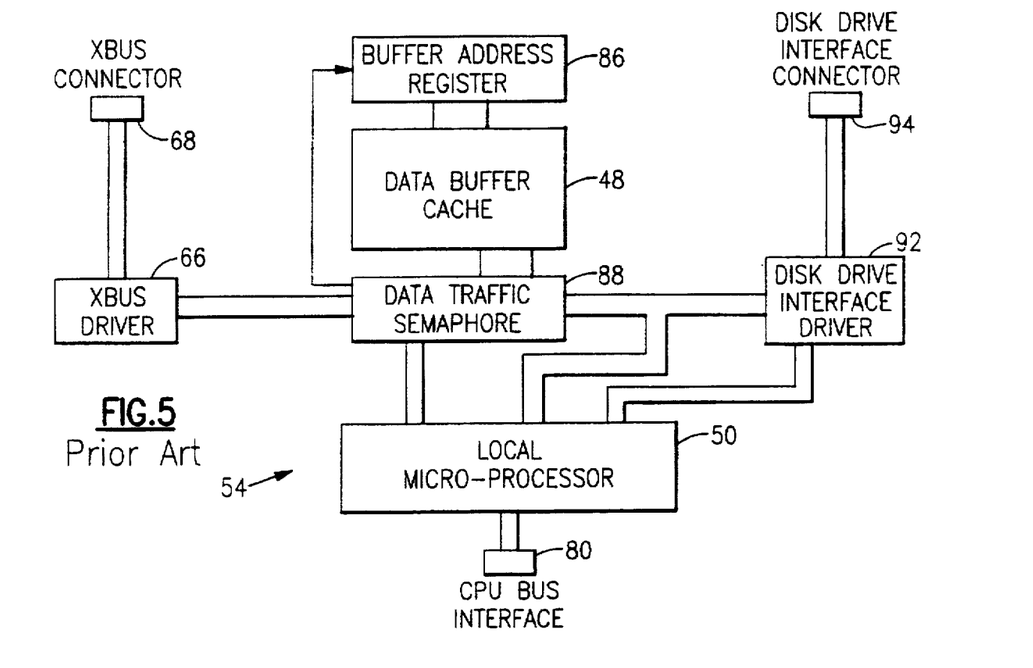
FIG. 5 is a simplified block diagram of the one of the disk controller channels of the disk memory platform of FIG. 3.

To get a better idea of the operation of the disk platform 28 of this invention, we will now turn to FIGS. 4 and 5 with particularity. FIG. 4 shows further details of the interface and driver unit generally labeled as 42 while FIG. 5 shows further details of one of the disk controller channels 46. With reference first to FIG. 4, there is an XBUS driver 66 connected to the XBUS 64 with a connector 68. There is also a host interface driver 70 (SCSI in the tested embodiment) connected into line 20 back to the host computer 10 by a connector 72. As with the other elements, there is also a local microprocessor 74 to control the operation of the elements of the interface and driver unit 42. The micro-processor 74 interfaces with a display driver 76 (which is connected to the display 44) and a serial interface driver 78 (which is connected to the serial interface on line 18). All the driver elements are well known to those skilled in the art and will be chosen according to the type of device with which they must interface. The microprocessor 74 is also connected to the CPU bus 52 with connector 80. The heart of the interface and driver unit 42 and most important part thereof is a pair of unidirectional FIFOs 82 and 84. Under the control of the local micro-processor 74, FIFO 82 receives and transmits data from the XBUS 66 to the host computer 10. Similarly, FIFO 84 receives and transmits requests and data from the host computer 10 to the XBUS 66. Thus, hi-directional transmissions can take place between the XBUS 66 and the host computer 10. This is another feature of this embodiment which improves the overall throughput of the system 22.

The disk controller channels 46 depicted in FIG. 5 also includes an XBUS driver 66 and a disk drive interface driver 92 connected to the associated disk drive 16 with their associated connectors 68, 94. Similarly, the local microprocessor 50 is connected to the CPU bus 52 with a connector 80. In addition to the data buffer memory 48, there is a buffer address register 86 which controls the locations in the memory 48 which are accessed and a data traffic semaphore 88 which operates in a manner readily apparent to those skilled in the art to control access to and from the memory 48 under the control of the micro-processor 58. Thus, it is the data traffic semaphore 88 which actually inserts the addresses into the buffer address register 86. The data traffic semaphore 88 must be present to prevent simultaneous access to the memory 48 by both the XBUS 64 (and elements connected therethrough) and the host computer 10. Such devices are well known and employed in the computing art for that purpose as any attempt to simultaneously read from and write into a memory location can cause irreversible errors.

The near line archival storage channel 100 is controlled in the same manner as disk controller channel 46 through microprocessor 50 and cache/buffer memory 48 and contains the logic to control by way of control bus 101 the near line archival storage 103 and its individual elements 104, 105 and 106 to read and write data by way of data bus 102. Data read from near line archival storage 103 is held in cache memory 56 or on disk drives 16 and is accessed by the host computer with sector numbers beyond the physical limits of disk drives 16 creating a virtually boundless storage capacity.

Figure 6:
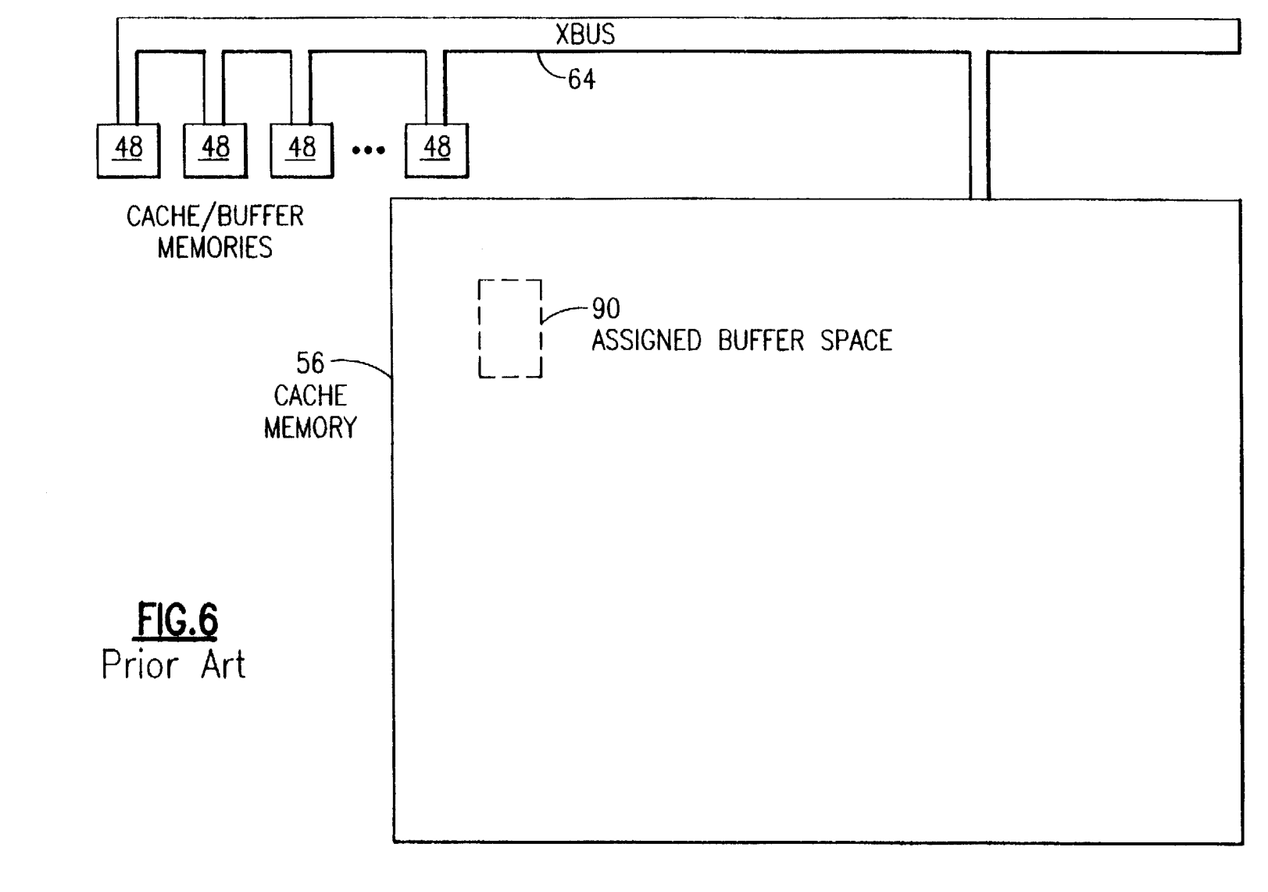
FIG. 6 is a simplified drawing employed for an example to show the dual asynchronous operation of the system of FIG. 2.

Having thus described the construction and operation of the system 22 in general, a more specific example of its unique mode of operation will now be described with reference to FIG. 6. For simplicity, FIG. 6 depicts in simplified form only the cache/buffer memories 48 in the channels and the cache memory 56 as connected by the XBUS 64. Assume that a request has been made by the host computer 10 to read data. The disk platform 28, of course, knows (or can determine) the location of the data in the disk drives 16 through its above-described access to the tables 24 in the host computer 10. According to fault tolerant techniques, the data (and its parity bits) are spread across the disk drives 16. From the contents of its private memory 62, the logic in the CPU 60 knows the present contents of the cache memory 56. Anything that is already in the cache memory 56 will not be re-read, of course, which is the usual function of any cache memory (i.e. to eliminate redundant and unnecessary disk accesses). The CPU 60 then issues high level requests to the various disk controller channels 46 to have them retrieve the elements of the data from their locations on the disk drives. The requests also go to the cache memory & control unit 54 so that it knows what is going on. From there on, the collection of the data and its transfer to the host computer 10 is under the control of the micro-processor 58 in the cache memory & control unit 54. The micro-processor 58 assigns available buffer space (as indicated by the dashed box 90) in which to receive the data of the request. The data segments are asynchronously brought into the buffer memories 48 under the control of the micro-processors 50 as a function of the originally-issued high level commands from the CPU 60. As the data segments are received, the micro-processor 58 is advised by the micro-processors 50 over the XBUS 64. The microprocessor 58 then asynchronously transfers the data segments into their appropriate location within the assigned buffer space 90. When the entire data of the request is in the assigned buffer space 90, the micro-processor 58 transfers it to the host computer 10 through the FIFO 82 described above. A write operation, of course, operated in much the same manner, except that data flow is in the opposite direction.

While only shown in simplified representation in FIG. 6, it may be appreciated therefrom and from a consideration of the elements and their method of operation as described above that the single cache memory 56 of substantial size as employed in this embodiment effect a vast improvement in simplicity and efficiency of operation (i.e. speed). Because of its size, the cache memory 56 will actually self-optimize the data it retains in cache over time so as to minimize the number of data transfers required with the disk drives. In this regard, it is important to recognize that the parity bits associated with data are contained in separately transferable locations on the disk drives 16. Thus, over the course of time the most used data and their parity bits will be virtually permanent residents of the cache memory 56 and will only be written to the disk drives 16 for backup purposes on a time-available basis in a background mode by the microprocessor 58. The impact of this on the overall performance of the system 22 should not be overlooked or minimized. Consider, if there are eight disk drives 16 containing the individual data bits of data and a ninth disk drive 16 containing the parity bits associated therewith, if the parity bits are contained in an unused portion of the cache memory 56 and only written to the ninth disk drive 16 when the eight disk drives 16 are not otherwise involved in an actual data transfer, disk access time to access data is reduced by one-ninth or eleven percent. The savings in time could be even more substantial in an instance where one of the eight disk drives 16 containing the data bits is malfunctioning and the parity bits are required to correct any errors in the data stream.

B. Description of the Invention (FIGS. 7 and 8)

Figures 7, 8:
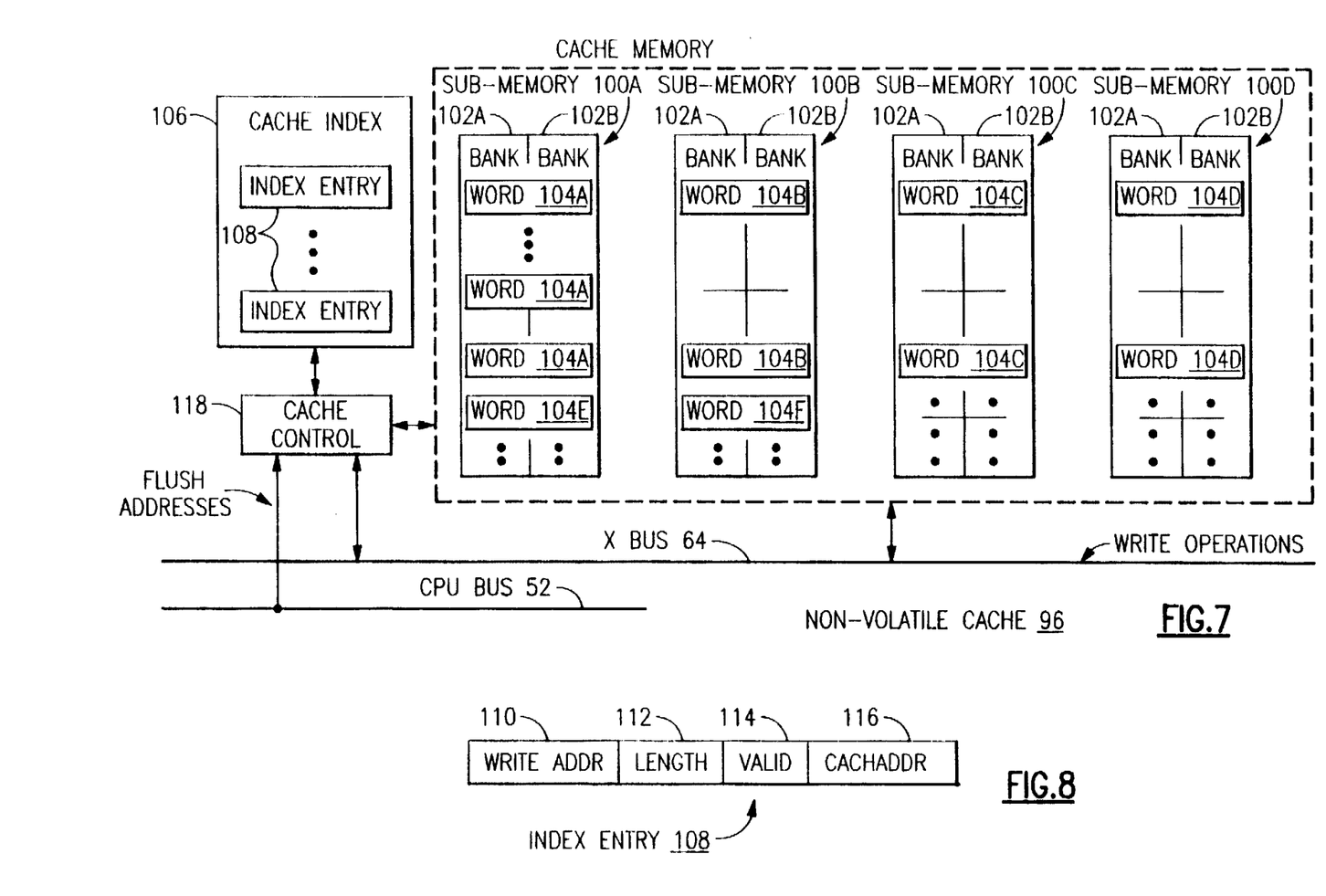
FIG. 7 is a diagrammatic representation of the present invention.
FIG. 8 is a representation of a cache index entry of the present invention.

Referring to FIG. 7, the present invention is diagrammatically illustrated therein using the system of FIG. 2 discussed above for an exemplary implementation of the present invention.

As has been described herein above with regard to the system illustrated in FIG. 2, Cache Memory & Control Unit 54 and Memory 56 operate under control of CPU 60 as a volatile cache, and essentially as a demand paging mechanism, to store data from Disk Drives 16 to be provided to Host Computer 10 and to store modified data written from Host Computer 10 to be written to Disk Drives 16.

Data is read from Disk Drives 16 and written to Disk Drives 16 under control of read and write addresses provided on X Bus 64 and CPU 60 and Cache Memory & Control Unit 54 are responsive to such read and write addresses to store data read from Disk Drives 16 and modified data to eventually be written back to Disk Drives 16 in Memory 56. Cache Memory & Control Unit 54 are also responsive to such read and write addresses to provide the data stored in Memory 56, that is, the data previously read from Disk Drives 16 and the modified data, directly to Host Computer 10 rather than reading the data from Disk Drives 16.

The data read from Disk Drives 16 and the modified data is stored in Memory 56 until Memory 56 is "flushed" by CPU 60, which provides cache flush addresses to Cache Memory & Control Unit 54 on CPU Bus 52 for this purpose. When Memory 56 is flushed, the data that has been read from Disk Drives 16, but that has not been subsequently modified, is discarded, for example, by "marking" the data in Memory 56 as invalid. The modified data is written into Disk Drives 16 and then discarded from Memory 56, again usually by marking the data as invalid.

Referring now to FIG. 7, therein is shown a block diagram of a Non-Volatile Cache 96 of the present invention wherein FIG. 7 repeats those portions of the system that is illustrated in FIG. 2 that are necessary to an understanding of the present invention. As discussed previously, the present invention addresses the problem of volatility of cache memories, such as that implemented as Memory 56 and Cache Memory & Control Unit 54, by providing a non-volatile cache operating in parallel with and mirroring Memory 56 and Cache Memory & Control Unit 54.

The non-volatile cache of the present invention is, as illustrated in FIG. 7, implemented as Non-Volatile Cache 96, which includes a Cache Memory 98 comprised of non-volatile memory devices, such as 16 bit wide by 256 k long PCMCIA SRAM (Static Random Access Memory) cards. As will be described below, Non-Volatile Cache 96 operates in parallel with Memory 56 and Cache Memory & Control Unit 54 upon each write operation on X Bus 64 to capture and store the data words being written into Memory 56, thereby requiring no additional X Bus 64 cycles to provide non-volatile caching of the data also stored in volatile Memory 56.

As has been discussed herein above, there are or can be significant differences between the data word widths and the maximum data read/write rates of the memory components comprising a non-volatile cache, such as Cache Memory 98, and the data word widths and data rates of an X Bus 64. For example, in the present exemplary implementation of a system as shown in FIG. 7, the data words to be encached are each 32 bits wide while each PCMCIA SRAM card is 16 bits wide and the data word transfer rate of X Bus 64 is such that the interval between data words on X Bus 64 is shorter than the minimum write time for a typical PCMCIA SRAM card.

As illustrated in FIG. 7, the difference in data word widths between the memory components of Cache Memory 98 and the difference between the data rate of X Bus 64 and the memory components of Cache Memory 98 is accommodated by constructing Cache Memory 98 of a plurality of Sub-Memories 100, each of which is comprised of a plurality of Memory Banks 102. For example, and because of the difference in width between data words appearing on X Bus 64 and the memories comprising PCMCIA SRAM cards, each Sub-Memory 100 is comprised of two 16 bit wide Memory Banks 102 connected in parallel, designated as 102A and 102B, so that each Sub-Memory 100 is thereby 32 bits wide and can thus store a 32 bit X Bus 64 data word at each address location therein. The difference between data word widths on X Bus 64 and in the memory units comprising Cache Memory 98 is thereby accommodated by using multiples of Memory Banks 102 wherein the number of Memory Banks 102 in each Sub-Memory 100 is determined by the ration between the data word widths of X Bus 64 and the memory units comprising Cache Memory 98. For example, if the data words on X Bus 64 were 64 bits wide, each Sub-Memory 100 would be four Memory Banks 102 wide and if the data words on X Bus 64 were 16 bits wide each Sub-Memory 100 would be one Memory Bank 102 wide.

The difference between the read/write rate of PCMCIA SRAM cards and X Bus 64, in turn, is accommodated by constructing Memory Cache 98 of a plurality Sub-Memories 100 which are written or read in succession for each transfer of one or more data words on X Bus 64 and with the read/write cycle of each Sub-Memory 100 overlapping those of the preceding Sub-Memories 100 in the read/write sequence.

As indicated generally in FIG. 7, Sub-Memories 100 are connected and addressed in parallel, so that a write operation of between one and four Words 104 will result in the Words 104 of the write operation being written into the same address location in each of Sub-Memories 100. That is, a given write operation will result in the allocation of one or more address locations in Sub-Memories 100 wherein each address location refers to and allocates a single Word 104 memory space in each Sub-Memory 100. The allocation of a single address location will therefore allocate Cache Memory 98 space for up to four Words 104. That is, and in the present implementation wherein there are four Sub-Memories 100, the first word of a four word write operation would be written into Sub-Memory 100A as Word 104A, the second into Sub-Memory 100B as Word 104B, the third into Sub-Memory 100C as Word 104C and the fourth into Sub-Memory 100D as Word 104D, with the write cycles of Sub-Memories 100A through 100D overlapping such that each Sub-Memory 100 can receive and store the corresponding Word 104 at the time it appears on X Bus 64. Correspondingly, a write operation of a single Word 104 would result in the single Word 104 being written into the allocated address location in Sub-Memory 100A while the corresponding memory spaces at the same address location in Sub-Memories 100B through 100D would be unused. In further example, in a six word write operation the first four words would be written into an allocated address location in Sub-Memories 100A to 100D, as just described, while the fifth and sixth Words 104 would be respectively written into a second address location in Sub-Memories 100A and 100B while that the second address location in Sub-Memories 100C and 100D would be unused. Again, and regardless of the number of data words in a given write operation, the write cycles of the Sub-Memories 100 are overlapped as necessary to achieve a data transfer rate equal to that of X Bus 64.

Referring again to FIG. 7, it is shown therein that Non-Volatile Cache 96 further includes an additional PCMCIA SRAM memory card designated as Cache Index 106 which is used to store an index of storage locations of Words 104 in Cache Memory 98. As illustrated in FIG. 8, Cache Index 106 stores an Index Entry 108 for each set of one or more Words 104 stored in Cache Memory 96 as a result of a corresponding write operation to Memory 56 on X Bus 64. As has been described herein above and as is well understood in the relevant arts, each such write operation will typically consist of a write address indicating a starting address from a sequence of One or more data words, a length field designating the number of data words to be transferred in the write operation, and one or more data words. Each Index Entry 108 correspondingly includes a Write Address Field (Write Addr) 110 for storing the write address provided on X Bus 64, a Length Field (Length) 112 for storing the contents of the length field appearing on X Bus 64, a Validity Bit (Valid) 114 for storing a bit indicating whether the data word or words stored in the corresponding locations in Cache Memory 98 are valid or invalid, for example, as a consequence of having been flushed, and a Cache Address Field (CachAddr) 116 for storing the address in Cache Memory 98 of the first Word 104 of the corresponding set or one or more words of the corresponding write operation.

As shown in FIG. 7, Non-Volatile Cache 96 further includes a Cache Control 118 connected from X Bus 64 and response to write operations thereupon for reading the write address and length fields of each write transfer from X Bus 64. Cache Control 118 then uses this information to access and read Cache Index 106 to find a block of one or more locations in Cache Memory 98 equal to or greater than the number of Words 104 to be transferred in the write operation. Having found a block of free locations in Cache Memory 98, Cache Control 118 then generates and provides write addresses and write control signals to Sub-Memories 100 to capture the Words 104 of the write operation from X Bus 64 as they appear on X Bus 64 and write the Words 104 of the write operation into the selected location or locations in Cache Memory 98 as described above.

Thereafter, any data written into Memory 56 may be recovered or read from Cache Memory 98, for example, if there is an accidental destruction of the data stored in Memory 56, by providing the X Bus 64 addresses of the data and a read command to Cache Control 118, in the usual manner. Cache Control 118 will then access and read the Index Entries 108 of Cache Index 106, using the X Bus 64 write addresses as indexes into Cache Index 106, and in particular to find the matching entries in Write Addr 110s. Having located the corresponding Index Entries 108, Cache Control 118 will determine whether the corresponding data in Cache Memory 98 is valid, from the Valid 114 fields, and, if valid, will determine the storage locations of the data in Cache Memory 98 from the CachAddr 116 and Length 112 fields of the corresponding Index Entries 108. Cache Control 118 will then generate the corresponding read addresses and read control signals to Sub-Memories 100 to read the data from Cache Memory 98 to X Bus 64.

Finally, and as described herein above, the operations of Cache Memory 98 mirror those of Cache Memory & Control Unit 54 and Memory 56 and, as such, data is "erased" from Cache Memory 98 and storage locations therein freed for further use when Memory 56 is "flushed". As described, CPU 60 "flushes" Memory 56 by providing "flush" addresses to Cache Memory & Control Unit 54 and Cache Memory & Control Unit 54 responds by flushing the corresponding locations in Memory 56, usually by marking the locations therein as containing invalid data. As indicated in FIG. 7, Cache Control 118 is connected from CPU Bus 52 to also receive the "flush" addresses provided from CPU 60 and will respond by operating in the manner described above with regard to reading data from Cache Memory 98, but instead of reading data from the corresponding locations in Cache Memory 98 will set the validity bits in the Valid 114 fields of the corresponding Index Entries 108 to the invalid state, thereby freeing the corresponding locations in Cache Memory 98 for subsequent use.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. A non-volatile cache mechanism for use in a mass storage mechanism connected from a host computer system for storing data operated upon by the host computer system, the mass storage mechanism including a plurality of mass storage devices, a bus connected from the host computer system for conducting write addressed and data from the host computer system to the mass storage devices, a volatile cache connected from the bus for storing data to be written to the mass storage devices, and a cache control processor connected from the bus and responsive to write operations on the bus, each write operation including a write address and at least one data word, for writing the data to be written into the mass storage devices into the volatile cache mechanism, the non-volatile cache mechanism comprising:

a non-volatile memory connected from the bus for receiving and storing the data words, a cache control connected from the bus and to the non-volatile memory and responsive to the write operations for controlling write operations of the non-volatile memory for writing the data words into the non-volatile memory in parallel with receipt of the data words into the volatile cache mechanism, a cache index connected from the cache control for storing index entries relating write addresses of write operations on the bus with corresponding storage addresses of the data words in the non-volatile memory, the cache control being responsive to a current write operation for reading the write address of the write operation, reading the index entries stored in the cache index to identify and select at least one available storage address in the non-volatile memory for storing the at least one data word of the current write operation, generating at least one index entry relating the write address of the current write operation and a selected at least one storage address in the non-volatile memory, and generating write control signals controlling the non-volatile memory to write the at least one data word of the current write operation into the selected at least one storage address in the non-volatile memory.

2. The non-volatile cache mechanism of claim 1, wherein:

the non-volatile memory is comprised of a plurality of non-volatile sub-memories, each storage address identifies a corresponding storage location in each one of the plurality of non-volatile sub-memories, and the cache control generates write control signals to each of the plurality of nonvolatile sub-memories so that corresponding write operations of each of the plurality of non-volatile sub-memories are sequentially overlapping so that a data word of the at least one data word of a write operation on the bus is written into a corresponding one of the plurality of non-volatile sub-memories at the rate at which the data words of the write operation appear on the bus.

3. The non-volatile cache mechanism of claim 1, wherein the cache control processor is operative to flush at least certain ones of the data words from the volatile cache mechanism by providing flush addresses corresponding to the write addresses of previous write operations on the bus to the volatile cache mechanism and wherein:

the cache control is connected from the cache control processor and responsive to the flush addresses for indexing the cache index to identify cache entries corresponding to the flush addresses and invalidating the corresponding cache entries.

4. The non-volatile cache mechanism of claim 1 wherein each index entry includes:

a write address field for storing a write address of a corresponding write operation, a length field for storing information identifying the number of data words in the at least one data word of the corresponding write operation, a cache address field for storing the corresponding storage address in the nonvolatile memory, and a validity field for storing information identifying whether the corresponding data words stored in the non-volatile memory are valid.

5. The non-volatile cache mechanism of claim 4, wherein the cache control processor is operative to flush at least certain ones of the data words from the volatile cache mechanism by providing flush addresses corresponding to the write addresses of previous write operations on the bus to the volatile cache mechanism and wherein:

the cache control is connected from the cache control processor and responsive to the flush addresses for indexing the cache index to identify index entries corresponding to the flush addresses and invalidating the corresponding index entries by setting the information stored in the validity field to a non-valid state.

* * * * *